US012607880B2

(12) United States Patent
Lan et al.

(10) Patent No.: US 12,607,880 B2
(45) Date of Patent: Apr. 21, 2026

(54) MULTIFOCAL TORIC LENS

(71) Applicant: Aquamax Vision Corporation,
Fremont, CA (US)

(72) Inventors: Chia-Hung Lan, Taoyuan (TW);
Yi-Fang Huang, Taoyuan (TW)

(73) Assignee: PEGAVISION CORPORATION,
Taoyuan City (TW)

( * ) Notice: Subject to any disclaimer, the term of this
patent is extended or adjusted under 35
U.S.C. 154(b) by 511 days.

(21) Appl. No.: 17/797,020

(22) PCT Filed: Jan. 31, 2022

(86) PCT No.: PCT/US2022/014560
§ 371 (c)(1),
(2) Date: Aug. 2, 2022

(87) PCT Pub. No.: WO2022/173608
PCT Pub. Date: Aug. 18, 2022

(65) Prior Publication Data
US 2023/0204979 A1     Jun. 29, 2023

(30) Foreign Application Priority Data

Feb. 9, 2021    (TW) ................................ 110105144
Nov. 2, 2021    (TW) ................................ 110140815

(51) Int. Cl.
*G02C 7/06*            (2006.01)
(52) U.S. Cl.
CPC ................................... *G02C 7/066* (2013.01)
(58) Field of Classification Search
CPC ................................................. G02C 7/066

USPC ...................................................... 351/159.42
See application file for complete search history.

(56)                  References Cited

U.S. PATENT DOCUMENTS 5,754,270 A * 5/1998 Rehse ..................... G02C 7/042
                                                      351/159.47
5,847,802 A * 12/1998 Menezes ................... G02C 7/06
                                                      623/6.28
6,260,966 B1 * 7/2001 Sawano .................. G02C 7/042
                                                      351/159.43
(Continued)

FOREIGN PATENT DOCUMENTS

CN        203745738 U     7/2014
CN        203745739 A     7/2014
(Continued)

*Primary Examiner* — Sharrief I Broome
(74) *Attorney, Agent, or Firm* — Hayes Soloway PC

(57)                  ABSTRACT

An intelligent multifocal lens includes an optical zone. The
optical zone includes a near vision zone, a transition vision
zone, and a far vision zone surrounding the near vision zone
and the transition vision zone. An add power of the near
vision zone has a negative correlation with a radius of the
near vision zone. A reduction of the power of the transition
zone is in a range of 0.1 D to 0.6 D. The near vision zone
and the transition vision zone have an interface therebe-
tween, and a power of the near vision zone and a power of
the transition vision zone at the interface therebetween are
the same. The transition vision zone and the far vision zone
have an interface therebetween, and a power of the transition
vision zone and a power of the far vision zone at the
interface therebetween are the same.

20 Claims, 7 Drawing Sheets

(56)                References Cited

U.S. PATENT DOCUMENTS

| | | | | |
|---|---|---|---|---|
| 6,286,956 | B1 * | 9/2001 | Oyama ................... | G02C 7/043 |
| | | | | 351/159.41 |
| 8,672,474 | B2 | 3/2014 | Lindacher | |
| 9,046,698 | B2 | 6/2015 | Hansen | |
| 2003/0117577 | A1 * | 6/2003 | Jones ..................... | G02C 7/042 |
| | | | | 351/159.41 |
| 2004/0085515 | A1 | 5/2004 | Roffman et al. | |
| 2010/0100177 | A1 | 4/2010 | Zhao | |
| 2011/0310347 | A1 * | 12/2011 | Lindacher .............. | G02C 7/061 |
| | | | | 351/159.14 |
| 2015/0226983 | A1 * | 8/2015 | Carmon ................. | G02C 7/065 |
| | | | | 351/159.42 |
| 2016/0198942 | A1 | 7/2016 | Dai | |
| 2017/0075137 | A1 | 3/2017 | Lin et al. | |
| 2018/0024380 | A1 | 1/2018 | Vu et al. | |
| 2019/0155057 | A1 * | 5/2019 | Varnas ................... | G02C 7/027 |

FOREIGN PATENT DOCUMENTS

| | | |
|---|---|---|
| CN | 105388632 A | 3/2016 |
| EP | 0926531 A1 | 6/1999 |
| EP | 2597508 A1 | 5/2013 |
| JP | 2006505008 A | 2/2006 |
| JP | 2010537247 A | 12/2010 |
| TW | 201617695 A | 5/2016 |
| TW | M533235 U | 12/2016 |
| WO | 2004042453 A1 | 5/2004 |
| WO | 2019036066 | 2/2019 |

* cited by examiner

| Group | Add power | age |
|---|---|---|
| 1 | +0.50D ~ +1.00D | 40~50 |
| 2 | +1.00D ~ +1.50D | 50~60 |
| 3 | +1.50D ~ +2.00D | 60~70 |
| 4 | +2.00D ~ +2.50D | 70~80 |

MULTIFOCAL TORIC LENS

CROSS-REFERENCE TO RELATED APPLICATION

This application is the National Stage Entry of International Application No. PCT/US2022/014560, filed Jan. 31, 2022, which claims priority to Taiwan Application Serial Number 110105144, filed Feb. 9, 2021, and Taiwan Application Serial Number 110140815, filed Nov. 2, 2021, which are herein incorporated by reference in its entireties.

BACKGROUND

Field of Invention

The present invention relates to an intelligent multifocal toric lens.

Description of Related Art

It takes time for an optometrist to provide a multifocal lens currently. Since power different between the near vision zone and the far vision zone is large, the users may experience poor adaptation problem or blurred vision problem at the intermediate vision zone. Dimension of human pupil tends to become smaller when the users become older, and therefore myopia becomes more serious. Therefore, single dimension of near vison zone design cannot satisfy the comfort requirement and vison correction requirement for the users of different ages.

In addition, except for the patients having myopia and presbyopia among all the patients having refractive error issues, there are about 30 percent of the patients having astigmatism. The astigmatism happens due to cornea deformation such that the cornea has dual curvatures with long axis and short axis like the rugby shape. Therefore, the long axis and the short axis of the cornea cannot refract the lights to the same focus. In order to correct astigmatism efficiently, the contact lens should not rotate after being worn by the users so as to make sure the correction function and focus the light from the two axes to the same point.

Accordingly, it is still a development direction for the industry to provide an intelligent multifocal toric lens of which the near vision zone is designed based the dimension of the pupil, and therefore the power difference between the near vision zone and the far vision zone can be accommodate.

SUMMARY

One aspect of the present disclosure is an intelligent multifocal lens.

In some embodiments, the intelligent multifocal lens includes an optical zone. The optical zone includes a near vision zone, a transition vision zone, and a far vision zone. An add power of the near vision zone has a negative correlation with a radius of the near vision zone. The transition vision zone surrounds the near vision zone. A reduction of the power of the transition zone is in a range of 0.1 D to 0.6 D. The near vision zone and the transition vision zone have an interface therebetween, and a power of the near vision zone and a power of the transition vision zone at the interface therebetween are the same. The far vision zone surrounds the near vision zone and the transition vision zone. The transition vision zone and the far vision zone have an interface therebetween, and a power of the transition vision zone and a power of the far vision zone at the interface therebetween are the same.

In some embodiments, a radius of the optical zone is in a range from about 4 mm to 4.5 mm.

In some embodiments, a distance between an inner radius and an outer radius of the transition vision zone is in a range from about 0.2 mm to 0.7 mm.

In some embodiments, a radius of the near vision zone is in a range from about 1.3 mm to 2.1 mm.

In some embodiments, an add power of the near vision zone is in a range from about +0.25 D to +3.50 D.

In some embodiments, the near vision zone includes a first region and a second region surrounding the first region.

In some embodiments, a power of the second region decrease when a distance between a center of the intelligent multifocal lens and the second region increases.

In some embodiments, the power of first region is substantially a constant, and the first region is connected with the second region.

In some embodiments, a radius of the first region is in a range from 0.00 mm to 1.00 mm.

In some embodiments, an add power of the far vision zone is in a range from about +0.5 D to +1.50 D.

Another aspect of the present disclosure is an intelligent multifocal toric lens for astigmatism.

In some embodiments, the intelligent multifocal toric lens includes an optical zone. The optical zone includes a near vision zone, a transition vision zone, and a far vision zone. An add power of the near vision zone has a negative correlation with a radius of the near vision zone. The transition vision zone surrounds the near vision zone. A reduction of the power of the transition zone is in a range of 0.1 D to 0.6 D. The near vision zone and the transition vision zone have an interface therebetween, and a power of the near vision zone and a power of the transition vision zone at the interface therebetween are the same. The far vision zone surrounds the near vision zone and the transition vision zone. The transition vision zone and the far vision zone have an interface therebetween, and a power of the transition vision zone and a power of the far vision zone at the interface therebetween are the same. The optical zone has a cylinder power and a cylinder axis configured to correct astigmatism.

In some embodiments, a radius of the optical zone is in a range from about 4 mm to 4.5 mm.

In some embodiments, a distance between an inner radius and an outer radius of the transition vision zone is in a range from about 0.2 mm to 0.7 mm.

In some embodiments, a radius of the near vision zone is in a range from about 1.3 mm to 2.1 mm.

In some embodiments, an add power of the near vision zone is in a range from about +0.25 D to +3.50 D.

In some embodiments, the near vision zone includes a first region and a second region surrounding the first region.

In some embodiments, a power of the second region decrease when a distance between a center of the intelligent multifocal toric lens and the second region increases.

In some embodiments of the intelligent multifocal toric lens, the power of first region is substantially constant at every angle of lens, and the first region is connected with the second region.

In some embodiments, a radius of the first region is in a range from 0.00 mm to 1.00 mm.

In some embodiments, an add power of the far vision zone is in a range from about +0.5 D to +1.50 D.

In some embodiments, the cylinder power is in a range from about −0.50 D to −3.50 D.

In some embodiments, the cylinder axis is in a range from about 5 degrees to 180 degrees.

In the aforementioned embodiments, the add power of the near vision zone of the intelligent multifocal toric lens of the present disclosure is designed based on the pupil radius so as to satisfy the requirements of vision correction for different ages. The design of smooth power reduction of the transition vision zone has advantages such as intelligent accommodation, reducing poor adaptation during transition, and reducing transition time. The design of smooth power reduction of the far vision zone has the advantages of reducing spherical aberration. In addition, the intelligent multifocal toric lens may correct presbyopia and astigmatism through designs of cylinder power and cylinder axis.

BRIEF DESCRIPTION OF THE DRAWINGS

The invention can be more fully understood by reading the following detailed description of the embodiment, with reference made to the accompanying drawings as follows:

FIG. 3 is a table of power range data of groups with different age based on FIG. 2;

DETAILED DESCRIPTION

Figure 1:
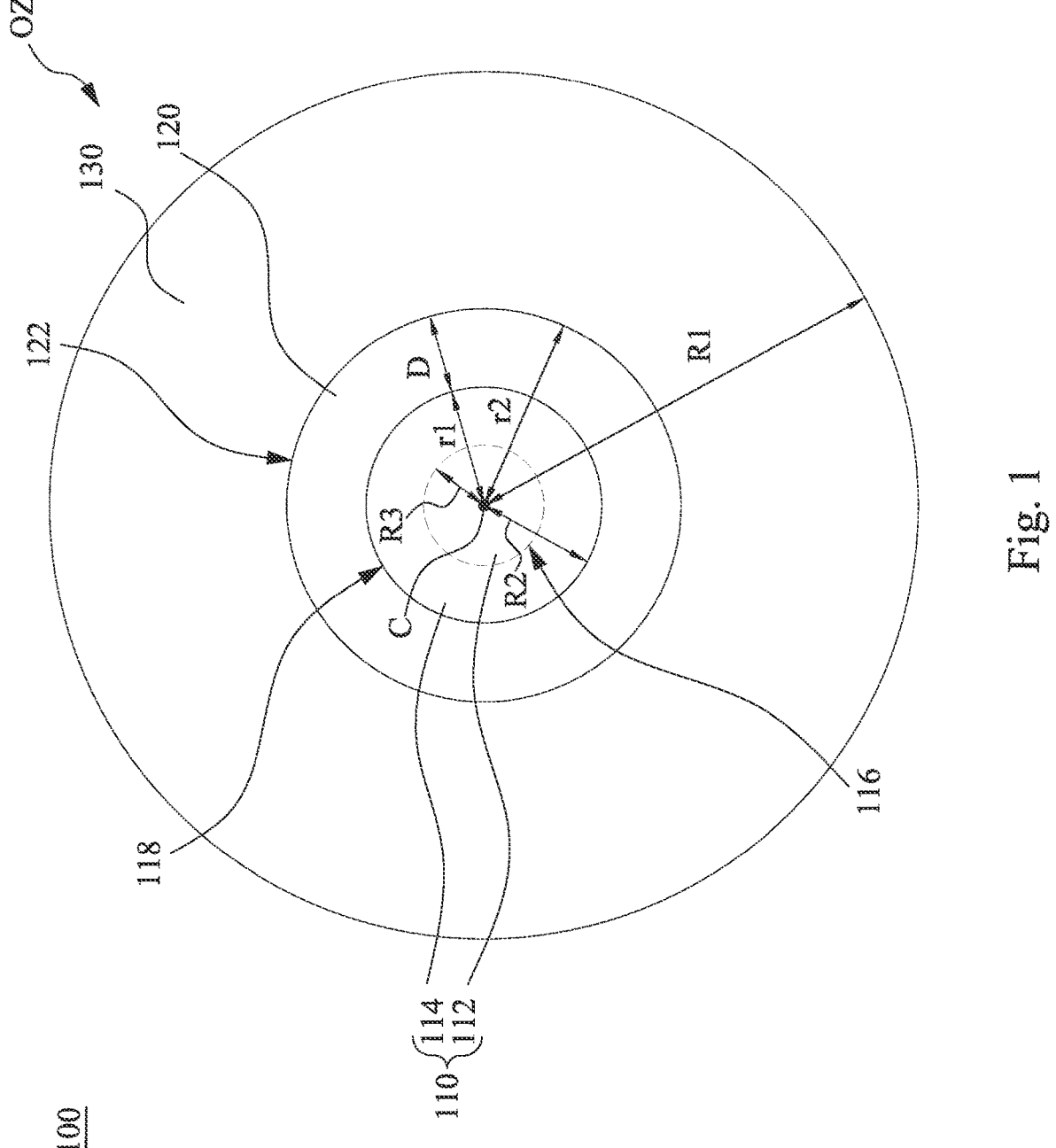
FIG. 1 is a top view of an intelligent multifocal lens according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a top view of an intelligent multifocal lens 100 according to one embodiment of the present disclosure. The intelligent multifocal lens 100 includes an optical zone OZ. The optical zone OZ includes a near vision zone 110, a transition vision zone 120, and a far vision zone 130. The optical zone OZ has a radius R1, and the radius R1 is in a range from about 4 mm to 4.5 mm. The near vision zone 110 has a radius R2, and the radius R2 is in a range from about 1.3 mm to 2.1 mm. The transition vision zone 120 surrounds the near vision zone 110. A distance D between an inner radius r1 and an outer radius r2 of the transition vision zone 120 is in a range from about 0.2 mm to 0.7 mm. The far vision zone 130 surrounds the transition vision zone 120 and the near vision zone 110. Specifically, the diameter of the optical zone OZ can cover the dimension of the pupil. In the present embodiment, the diameter of the optical zone OZ is about 8 mm to 9 mm, but the present disclosure is not limited thereto.

The near vision zone 110 includes a first region 112 and a second region 114 surrounding the first region 112. The power of the first region 112 is a constant value. A radius R3 of the first region 112 is in a range from 0.00 mm to 1.00 mm, and the first region 112 is connected with the second region 114. The power of the second region 114 decreases from the interface 116 to the interface 118. In other words, the diopter (negative value) of the second region 114 increases (i.e., absolute value is greater) in radical direction.

Figure 2:
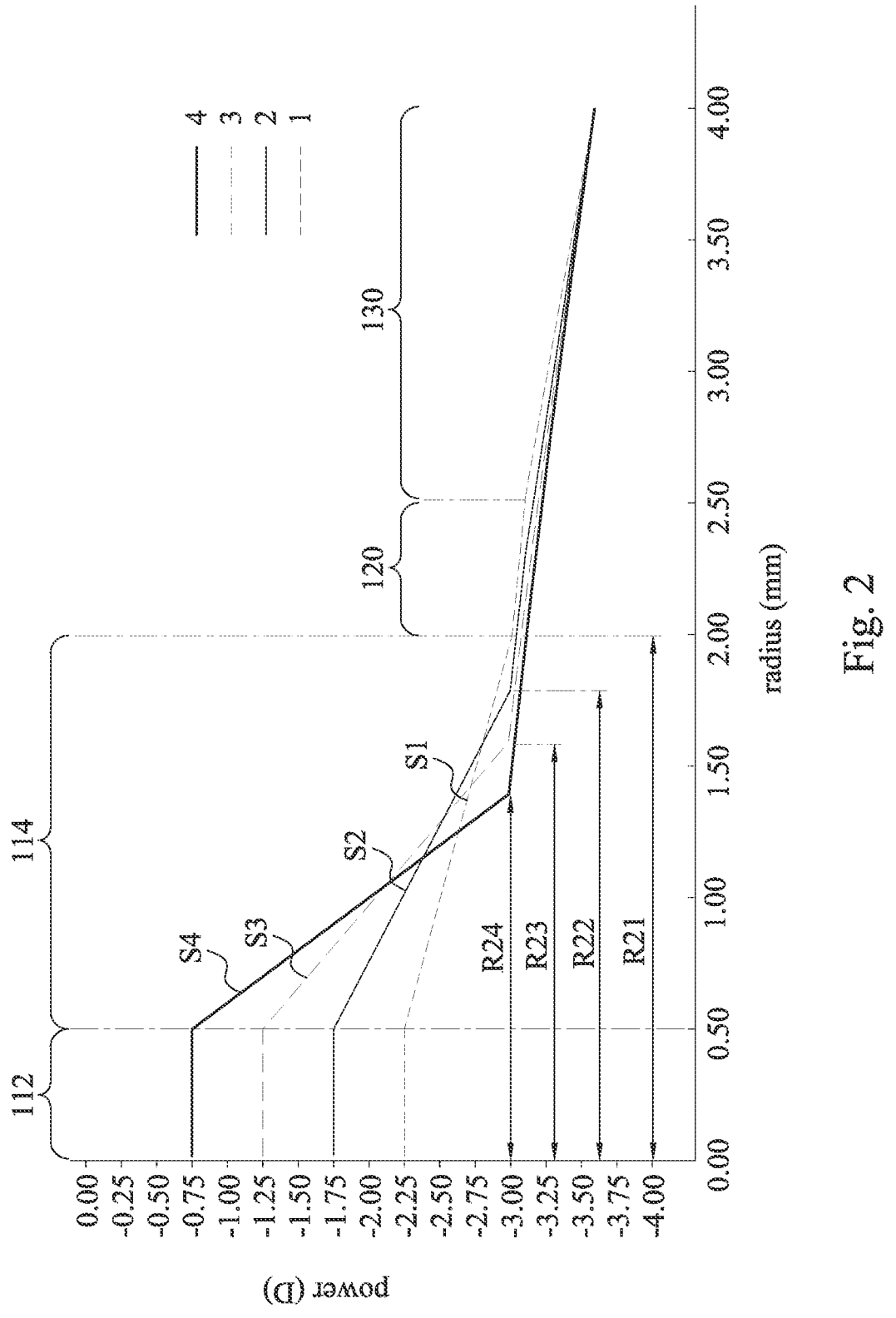
FIG. 2 is a diagram of the power and the radius of intelligent multifocal lenses according to one embodiment of the present disclosure.

FIG. 2 is a diagram of the power and the radius of intelligent multifocal lenses according to one embodiment of the present disclosure. Relations between the power and the radius of four intelligent multifocal lenses are demonstrated as examples. An add power ADD of the second region 114 of the near vision zone 110 is in a range from about +0.25 D to +0.35 D. In other word, a power difference between the second region 114 and the first region 112 is in a range from about 0.25 D to 3.00 D. According to the data in FIG. 2, the second region 114 with the add power ADD in a range from about +0.75 D to +2.25 D is demonstrated as an example. The first region 112 with radius about 0.50 mm is demonstrated as an example. The add power ADD and the radius of the second region 114 of the near vision zone 110 is designed based on age, and it will be described in detail in the following paragraphs.

A reduction of the power of the transition vision zone 120 is in a range of 0.1 D to 0.6 D. In other words, a power difference between the transition vision zone 120 and the near vision zone 110 is in a range from about 0.10 D to 0.60 D. For example, the distance D between the inner radius r1 and the outer radius r2 is about 0.5 mm. The reduction of the power of the transition vision zone 120 is designed based on add power ADD of the second region 114 of the near vision zone 110 so as to accommodate the power difference between the near vison and the far vison to avoid poor adaptation or blurred vision.

An add power ADD of the far vision zone 130 is in a range from about +0.5 D to +1.50 D. In other words, a power difference between the far vision zone 130 and the transition vision zone 120 is in a range from about 0.5 D to 1.50 D. By controlling the power different between the far vision zone 130 and the transition vision zone 120 in this range, the spherical aberration can be improved.

As shown in FIG. 2, change of the power of the optical zone OZ along the radius R1 is continuous. Specifically, the power of the second region 114 and the power of the first region 112 are continuous. In other words, the power of the first region 112 and the power of the second region 114 at an interface 116 between the second region 114 and the first region 112 (that is, the position with radius 0.5 mm) are the same and are not step-like. Similarly, the power of the transition vision zone 120 and the power of the near vision zone 110 are continuous, and the power of the far vision zone 130 and the power of the transition vision zone 120 are continuous. That is, the power of the near vision zone 110 and the power of the transition vision zone 120 at an interface 118 (that is, the position with radius 2.00 mm) are the same and are not step-like. The power of the far vision zone 130 and the power of the transition vision zone 120 at an interface 122 (that is, the position with radius 2.50 mm) are the same and are not step-like. As such, poor adaptation or blurred vision can be avoided.

FIG. 3 is a table of power range data of groups with different age based on FIG. 2. Reference is made to FIG. 2 and FIG. 3. The power and radius data presented through the curves S1, S2, S3, and S4 respectively correspond to the power data and ages of group 1, group 2, group 3, and group 4 in FIG. 3. In the present embodiment, ages of users are categorized into four groups. These four groups includes a group 1 corresponding to ages 40 to 50 years, a group 2 corresponding to ages 50 to 60 years, a group 3 corresponding to ages 60 to 70 years, and a group 4 corresponding to ages 70 to 80 years. That is, groups 1 to 4 correspond to younger groups to older groups. It is noted that, such ranges used to categorize ages of users are merely exemplary, and a person having ordinary skill in the art may adjusts numbers of groups and age range based on practical requirement. For example, in other embodiments, the range of age in each group is 5, and there may be eight groups with different ages used to define the power and the radius of the near vision zone 110.

As shown in the FIG. 3, the near vision zone 110 of the group 1 has a radius R21, and the radius R21 is 2.0 mm. In other embodiments, the radius R21 can be in a range from about 1.9 mm to 2.1 mm. The add power ADD of the second region 114 of the near vision zone 110 of the group 1 is in a range from about +0.50 D to +1.00 D. That is, the power difference between the second region 114 and the first region 112 of the group 2 is in a range from about 0.50 D to 1.00 D. As indicated by the curve S1 in FIG. 2, the power of the curve S1 in reduced from about −2.25 D to −3.00 D. That is, the power difference of the curve S1 is about 0.75 D.

The near vision zone 110 of the group 2 has a radius R22, and the radius R22 is 1.8 mm. In other embodiments, the radius R22 can be in a range from about 1.7 mm to 1.9 mm. The add power ADD of the second region 114 of the near vision zone 110 of the group 2 is in a range from about +1.00 D to +1.50 D. That is, the power difference between the second region 114 and the first region 112 of the group 2 is in a range from about 1.00 D to 1.50 D. As indicated by the curve S2 in FIG. 2, the power of the curve S2 in reduced from about −1.75 D to −3.00 D. That is, the power difference of the curve S2 is about 1.25 D.

The near vision zone 110 of the group 3 has a radius R23, and the radius R23 is 1.6 mm. In other embodiments, the radius R23 can be in a range from about 1.5 mm to 1.7 mm. The add power ADD of the second region 114 of the near vision zone 110 of the group 3 is in a range from about +1.50 D to +2.00 D. That is, the power difference between the second region 114 and the first region 112 of the group 3 is in a range from about 1.50 D to 2.00 D. As indicated by the curve S3 in FIG. 2, the power of the curve S2 in reduced from about −1.75 D to −3.00 D. That is, the power difference of the curve S3 is about 1.75 D.

The near vision zone 110 of the group 4 has a radius R24, and the radius R24 is 1.4 mm. In other embodiments, the radius R24 can be in a range from about 1.3 mm to 1.5 mm. The add power of the second region 114 of the near vision zone 110 of the group 4 is in a range from about +2.00 D to +2.50 D. That is, the power difference between the second region 114 and the first region 112 of the group 4 is in a range from about 2.00 D to 2.50 D. As indicated by the curve S4 in FIG. 2, the power of the curve S4 in reduced from about −0.75 D to −3.00 D. That is, the power difference of the curve S4 is about 2.25 D.

As indicated by curves S1-S4, the add power ADD of the near vision zone 110 has a negative correlation with the radius of the near vision zone 110. In general, dimension of the pupil tends to become smaller when the users become older. Therefore, by categorizing the add power ADD of the near vision zone 110 based on ages can satisfy the requirements of vision correction in the near vision zone 110 for different ages. In addition, since the radius R2 of the near vision zone 110 is designed based the dimension of the pupil, lens wear discomfort can be reduced. The aforementioned design may be applied in soft contact lens, hard contact lens, and so on. Such design may be configured to correct presbyopia (age-related farsightedness), and astigmatism. In other word, such design can correct presbyopia for users at different ages.

As indicated by curves S1-S4, the power of the transition vision zone 120 gradually decreased from the add power ADD of the near vision zone 110 continuously. By controlling the reduction of the power of the transition vision zone 120 in a range of 0.1 D to 0.6 D, vision transition between the near vision zone 110 and the far vision zone 130 is smooth. Therefore, poor adaptation during transition can be avoided and transition time can be reduced. The radii of the second region 114 of the present disclosure vary with properties of different groups. As shown in FIG. 3, merely the sizes of the second region 114 and the transition vision zone 120 of the curve S2 are labeled.

As indicated by curves S1-S4, the reduction of the power of the far vision zone 130 is controlled in a range of 0.5 D to 1.5 D. In general, the radius of the far vision zone 130 vary with the size of the optical zone OZ, size of the near vision zone 110, and the size of the transition vision zone 120. For example, an intelligent multifocal lens of which the radius R1 of the optical zone OZ is 4 mm may has a radius R4 of the near vision zone 110 equals to 1.4 mm, a distance D of the transition vision zone 120 equals to 0.5 mm, and a radius of the far vision zone 130 equals to 2.1 mm. Therefore, spherical aberration can be improved as long as the power difference of the far vision zone 130 is controlled in a range of 0.5 D to 1.5 D.

Figure 4A:
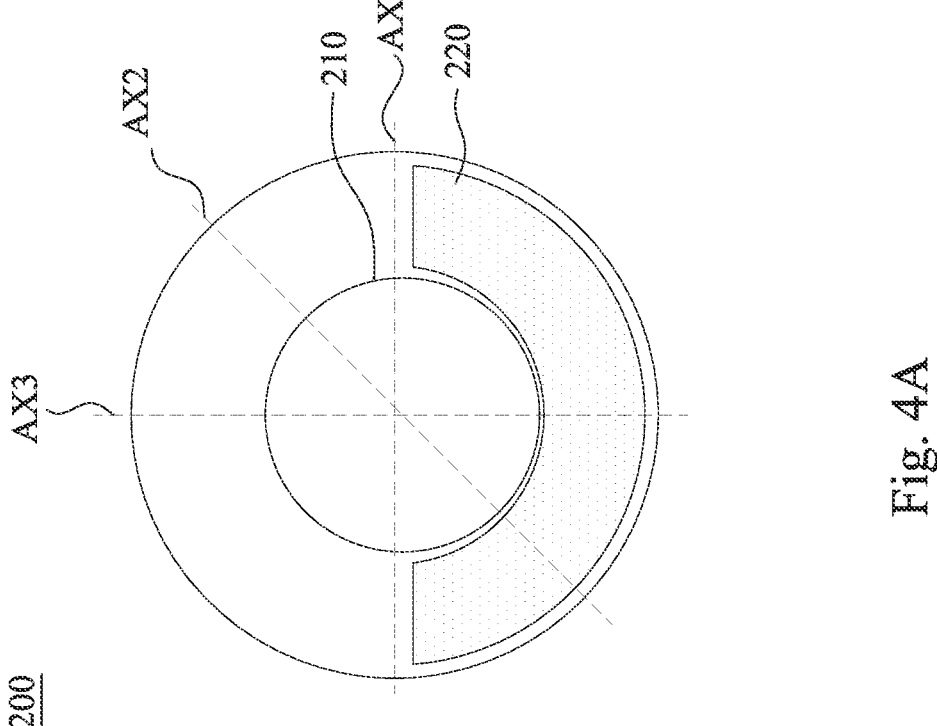
FIG. 4A is a top view of an intelligent multifocal toric lens for astigmatism according to one embodiment of the present disclosure.

FIG. 4A is a top view of an intelligent multifocal toric lens for astigmatism 200 according to one embodiment of the present disclosure. The intelligent multifocal toric lens for astigmatism 200 includes an astigmatism optical zone 210 and an astigmatism stability thick zone 220. The astigmatism stability thick zone 220 of the present disclosure is positioned at the bottom of the lens. Such design is the Prism-Ballast Type. For example, the present embodiment can be a soft contact lens.

Figure 4B:
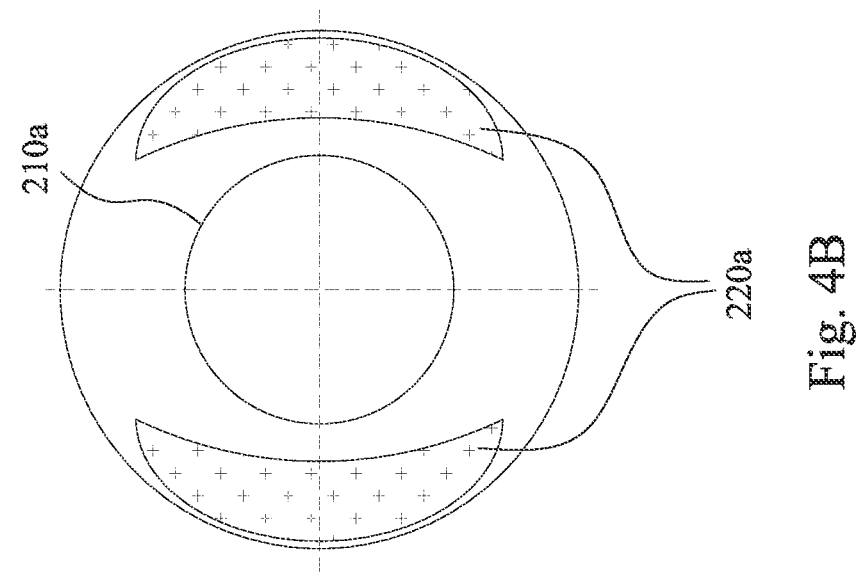
FIG. 4B is another top view of an intelligent multifocal toric lens for astigmatism according to another embodiment of the present disclosure.

FIG. 4B is another top view of an intelligent multifocal toric lens for astigmatism 200a according to another embodiment of the present disclosure. The intelligent multifocal toric lens for astigmatism 200a includes an astigmatism optical zone 210a and astigmatism stability thick zones 220a. Two astigmatism stability thick zones 220a are present respectively at the left hand side and the right hand side of the lens. Such design is the Double Slab-off Type.

The astigmatism optical zones 210, 210a includes the aforementioned near vision zone, transition vision zone, and the far vision zone. The astigmatism stability thick zones 220, 220a are configured to keep lens from rotation after the lens is worn by the users so as to make sure the correction function. The stability thick zones are not limited by those types as described above.

Figure 5:
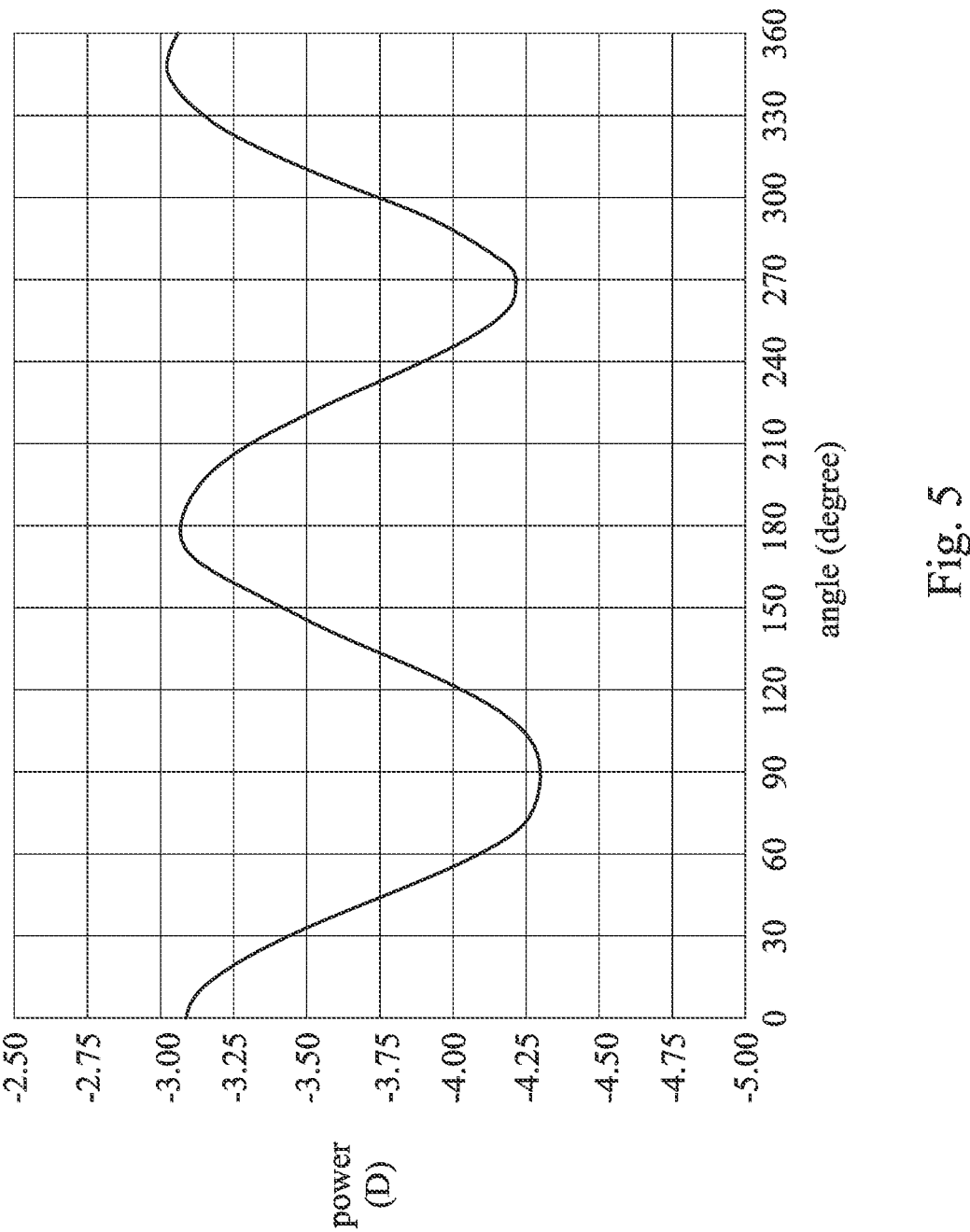
FIG. 5 is a power profile of toric lens for astigmatism according to one embodiment of the present disclosure.

FIG. 5 is a power profile of toric lens for astigmatism according to one embodiment of the present disclosure. Specifically, the astigmatism optical system includes double power magnitude (toric optic) such as spherical power, cylinder power, and cylinder axis. The embodiment shown in FIG. 5 includes spherical power equals to −3.00 D, cylinder power equals to −1.25 D, and cylinder axis equals to 180 degrees. Therefore, as shown in FIG. 5, the powers at the positions with axis 90 degrees and axis 270 degrees are about −4.25 D, and the powers at the positions with axis 0 degree and 180 degrees are about −3.00 D.

Figure 6:
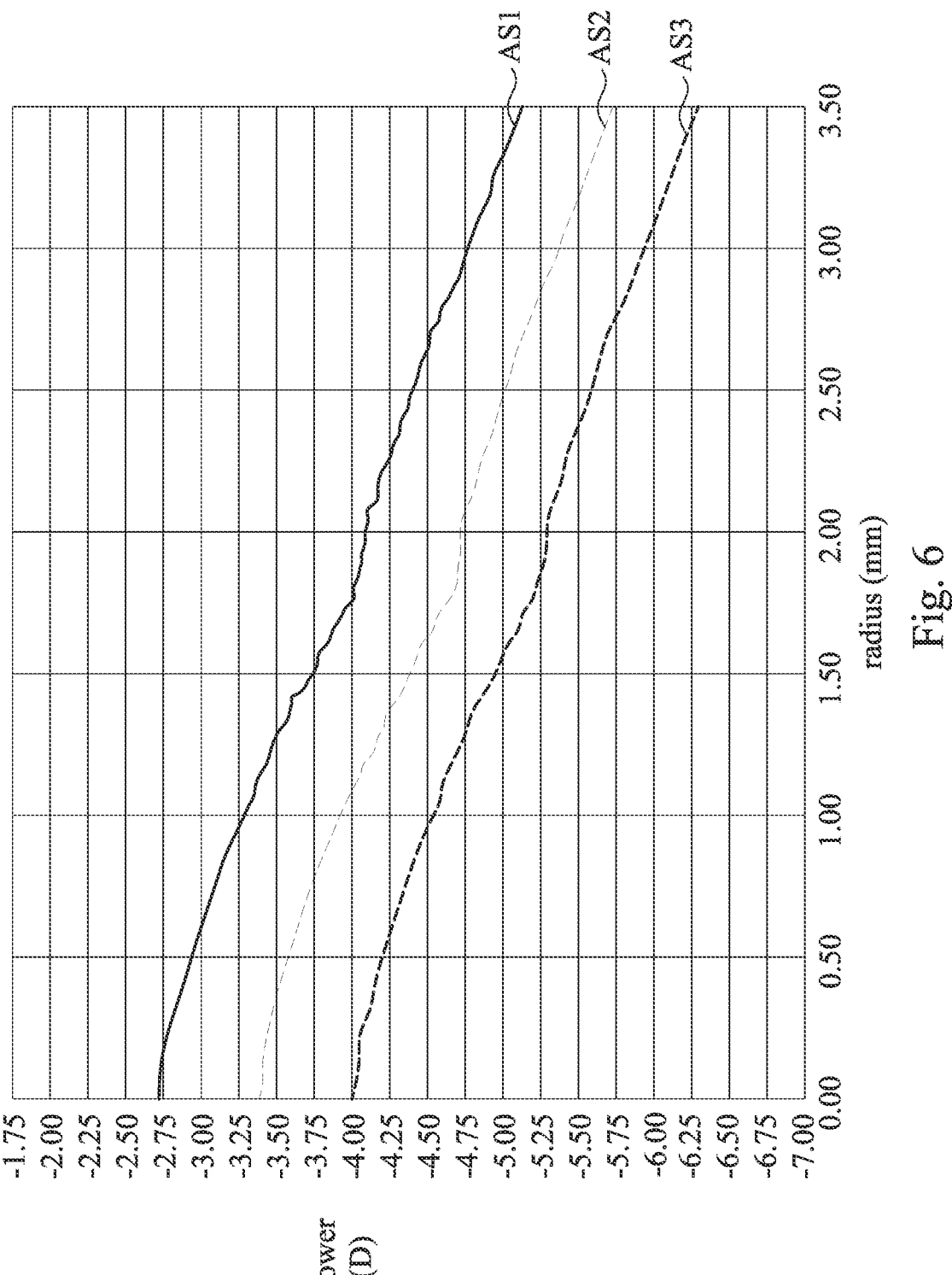
FIG. 6 is a diagram of the power profile and the radius taken along various axis of an intelligent multifocal toric lens for astigmatism according to one embodiment of the present disclosure.

FIG. 6 is a diagram of the power profile and the radius taken along various axis of an intelligent multifocal toric lens for astigmatism according to one embodiment of the present disclosure. Reference is made to FIG. 4A and FIG. 6. An axis AX1 equals to 0 degree, an axis AX2 equals to 45 degrees, and an axis AX3 equals to 90 degrees are illustrated in FIG. 4A. Curves AS1, AS2, and AS3 are relation curves of the powers and the radii along the axis AX1, AX2, and AX3. In the present embodiment, the spherical power equals to −4.00 D, the cylinder power equals to −1.25 D, the axis equals to 180 degrees, and the add power equals to +1.25 D (that is the add power of presbyopia). Accordingly, the intelligent multifocal toric lens for astigmatism can satisfy the requirements for the power and the radius as shown in FIG. 2, the cylinder power, and the cylinder axis. Such design may provide clear near vision and far vision for users having presbyopia and astigmatism.

In some embodiments, the spherical power range of the intelligent multifocal toric lens for astigmatism is in a range from +10.0 D to −10.0 D, the cylinder power range is in a range from −0.50 D to −3.50 D, the cylinder axis is in a range from 5 degrees to 180 degrees, and the add power is in a range from +0.75 D to +3.50 D. The advantages of intelligent multifocal and astigmatism correction can be achieved by presenting aforementioned designs at the same side of lens (front curve or back curve), or be presented respectively at two sides of the lens.

In summary, the add power of the near vision zone of the intelligent multifocal toric lens of the present disclosure is designed based on the pupil radius so as to satisfy the requirements of vision correction for different ages. The design of smooth power reduction of the transition vision zone has advantages such as intelligent accommodation, reducing poor adaptation during transition, and reducing transition time. The design of smooth power reduction of the far vision zone has the advantages of reducing spherical aberration. In addition, the intelligent multifocal toric lens may correct astigmatism through designs of cylinder power and cylinder axis.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An multifocal lens, comprising:
an optical zone, comprising:
    a near vision zone, wherein an add power of the near vision zone has a negative correlation with a radius of the near vision zone;
    a transition vision zone surrounding the near vision zone, wherein a reduction of the power of the transition vision zone is in a range of 0.1 D to 0.6 D, the near vision zone and the transition vision zone have an interface therebetween, and a power of the near vision zone and a power of the transition vision zone at the interface therebetween are the same; and
    a far vision zone surrounding the near vision zone and the transition vision zone, wherein the transition vision zone and the far vision zone have an interface therebetween, and a power of the transition vision zone and a power of the far vision zone at the interface therebetween are the same, and wherein an add power of the far vision zone is in a range from about +0.5 D to +1.50 D.

2. The multifocal lens of claim 1, wherein a radius of the optical zone is in a range from about 4 mm to 4.5 mm.

3. The multifocal lens of claim 1, wherein a distance between an inner radius and an outer radius of the transition vision zone is in a range from about 0.2 mm to 0.7 mm.

4. The multifocal lens of claim 1, wherein a radius of the near vision zone is in a range from about 1.3 mm to 2.1 mm.

5. The multifocal lens of claim 1, wherein an add power of the near vision zone is in a range from about +0.25 D to +3.50 D.

6. The multifocal lens of claim 1, wherein the near vision zone comprises a first region and a second region surrounding the first region.

7. The multifocal lens of claim 6, wherein a power of the second region decrease when a distance between a center of the multifocal lens and the second region increases.

8. The multifocal lens of claim 6, wherein the power of first region is substantially constant, and the first region is connected with the second region.

9. The multifocal lens of claim 6, wherein a radius of the first region is in a range from 0.00 mm to 1.00 mm.

10. An multifocal toric lens for astigmatism, comprising:
an optical zone, comprising:
    a near vision zone, wherein an add power of the near vision zone has a negative correlation with a radius of the near vision zone;
    a transition vision zone surrounding the near vision zone, wherein a reduction of the power of the transition vision zone is in a range of 0.1 D to 0.6 D, the near vision zone and the transition vision zone have an interface therebetween, and a power of the near vision zone and a power of the transition vision zone at the interface therebetween are the same; and
    a far vision zone surrounding the near vision zone and the transition vision zone, wherein the transition vision zone and the far vision zone have an interface therebetween, and a power of the transition vision zone and a power of the far vision zone at the interface therebetween are the same, and an add power of the far vision zone is in a range from about +0.5 D to +1.50 D, and wherein the optical zone has a cylinder power and a cylinder axis.

11. The multifocal toric lens for astigmatism of claim 10, wherein a radius of the optical zone is in a range from about 4 mm to 4.5 mm.

12. The multifocal toric lens for astigmatism of claim 10, wherein a distance between an inner radius and an outer radius of the transition vision zone is in a range from about 0.2 mm to 0.7 mm.

13. The multifocal toric lens for astigmatism of claim 10, wherein a radius of the near vision zone is in a range from about 1.3 mm to 2.1 mm.

14. The multifocal toric lens for astigmatism of claim 10, wherein an add power of the near vision zone is in a range from about +0.25 D to +3.50 D.

15. The multifocal toric lens for astigmatism of claim 10, wherein the near vision zone comprises a first region and a second region surrounding the first region.

16. The multifocal toric lens for astigmatism of claim 15, wherein a power of the second region decrease when a distance between a center of the multifocal toric lens and the second region increases.

17. The multifocal toric lens for astigmatism of claim 15, wherein the power of first region is substantially constant at every angle of lens, and the first region is connected with the second region.

18. The multifocal toric lens for astigmatism of claim 15, wherein a radius of the first region is in a range from 0.00 mm to 1.00 mm.

19. The multifocal toric lens for astigmatism of claim 10, wherein the cylinder power is in a range from about −0.50 D to −3.50 D.

20. The multifocal toric lens for astigmatism of claim 10, wherein the cylinder axis is in a range from about 5 degrees to 180 degrees.

* * * * *